Dec. 26, 1933.   M. K. DOUGLAS   1,941,434
FOUNDRY PLANT
Filed June 22, 1929   9 Sheets-Sheet 4

Dec. 26, 1933.  M. K. DOUGLAS  1,941,434
FOUNDRY PLANT
Filed June 22, 1929   9 Sheets-Sheet 9

Inventor
Malcolm Kenneth Douglas
By his Attorney

Patented Dec. 26, 1933

1,941,434

UNITED STATES PATENT OFFICE

1,941,434

FOUNDRY PLANT

Malcolm Kenneth Douglas, New York, N. Y., assignor to American Radiator Company, New York, N. Y., a corporation of New Jersey Application June 22, 1929. Serial No. 372,881

10 Claims. (Cl. 22—1)

My invention relates to new and useful improvements in foundry plants, and more particularly to a method of casting articles and the apparatus for carrying the method into effect.

An object of my invention is to provide a foundry plant in which articles may be cast expeditiously and efficiently and with a minimum of manual labor.

Another object is to provide a method of operation of a casting plant, which results in substantially continuous production of cast articles.

The invention consists in the improved construction and combination of parts, their aggroupment in operative relation, and the method of operation to be performed thereby, all to be more fully described hereinafter and the novelty of which will be particularly pointed out and distinctly claimed.

In the accompanying drawings, to be taken as a part of this specification, I have fully and clearly illustrated a preferred embodiment of my invention, in which drawings:—

Figures 1$^a$ and 1$^b$ together comprise a plan view of my foundry plant;

Figs. 2$^a$ and 2$^b$ together comprise a view of my plant in vertical section on the line 1—1 of Figs. 1$^a$ and 1$^b$;

Fig. 3 is a view in vertical section on the line 3—3 of Fig. 1$^b$;

Fig. 15 is a view in vertical central section of the top portion of a poured flask.

Figure 7:
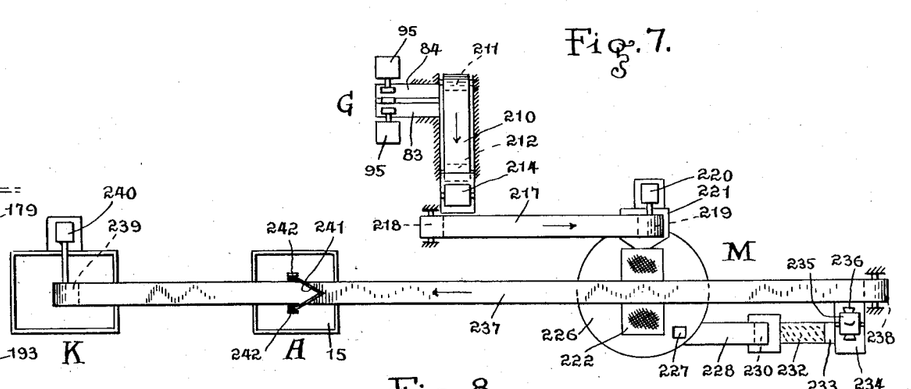
Fig. 7 is a diagrammatic plan view of certain mold and core forming material handling apparatus.
Figure 8:
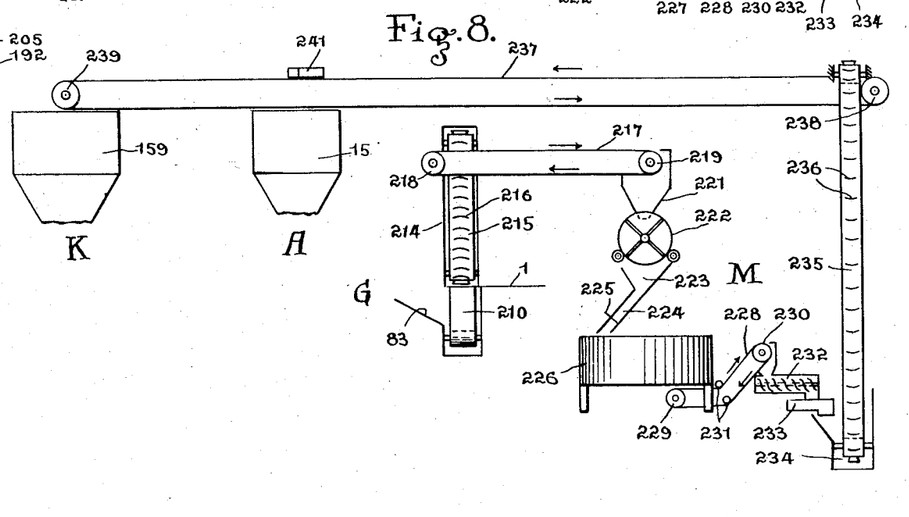
Fig. 8 is a view in elevation of the apparatus of Fig. 7.

Referring to the drawings by characters of reference, A designates a molding or mold forming station, which may comprise apparatus as shown and described in Letters Patent 1,859,658, granted May 24, 1932 on my copending application, Serial No. 349,918, filed March 26, 1929, and where the molds are formed in flask bodies from finely divided material such as molding sand. Adjacent the station A is an endless conveyor means B for transmission of the flask molds through a drying or baking zone C to an assembly zone or station D. From the station D the flask molds are carried by the conveyor means B to a pouring zone or station E, through a cooling zone F to a shakeout zone or station G and thence through a return zone H to a point near the molding station A, thus completing a cycle of operation. Preferably adjacent the station A, for compactness and efficiency of plant operation, is a core making station K, which may comprise apparatus as shown and described in Letters Patent 1,802,241, granted April 21, 1931 on my copending application Serial No. 351,249, filed March 30, 1929, and at which core members are formed from finely divided material, such as core sand for use with the flask molds prepared at station A. Extending from the station K to the assembly station D, and preferably through the drying or baking zone C, is a conveyor means L for transmission of the core members from station K to station D, so that the core members will be dried or baked during transfer to station D, and upon their delivery at station D will be ready for assembly with the molds. In addition to the stations mentioned, is a sand mixing or preparing station M (Fig. 7), to which the burnt or used molding material is returned by suitable conveyor means for tempering from the shake-out station G, and from which the supply of molding material and core forming material such as sand is fed by suitable conveyor means to the stations A and K.

The plant, as laid out in the drawings and as described hereinafter, is particularly adapted for the casting of tubular members, such for example as lengths of pipe, or the like; but it is obvious that the plant may be utilized for the casting of other articles, and it is therefore to be noted that the description is merely illustrative of one use, and is not to be taken as a limitation. The foregoing brief description sets forth the correlation and interdependence of the parts which go to the formation and method of operation of my novel foundry plant.

Figure 1:
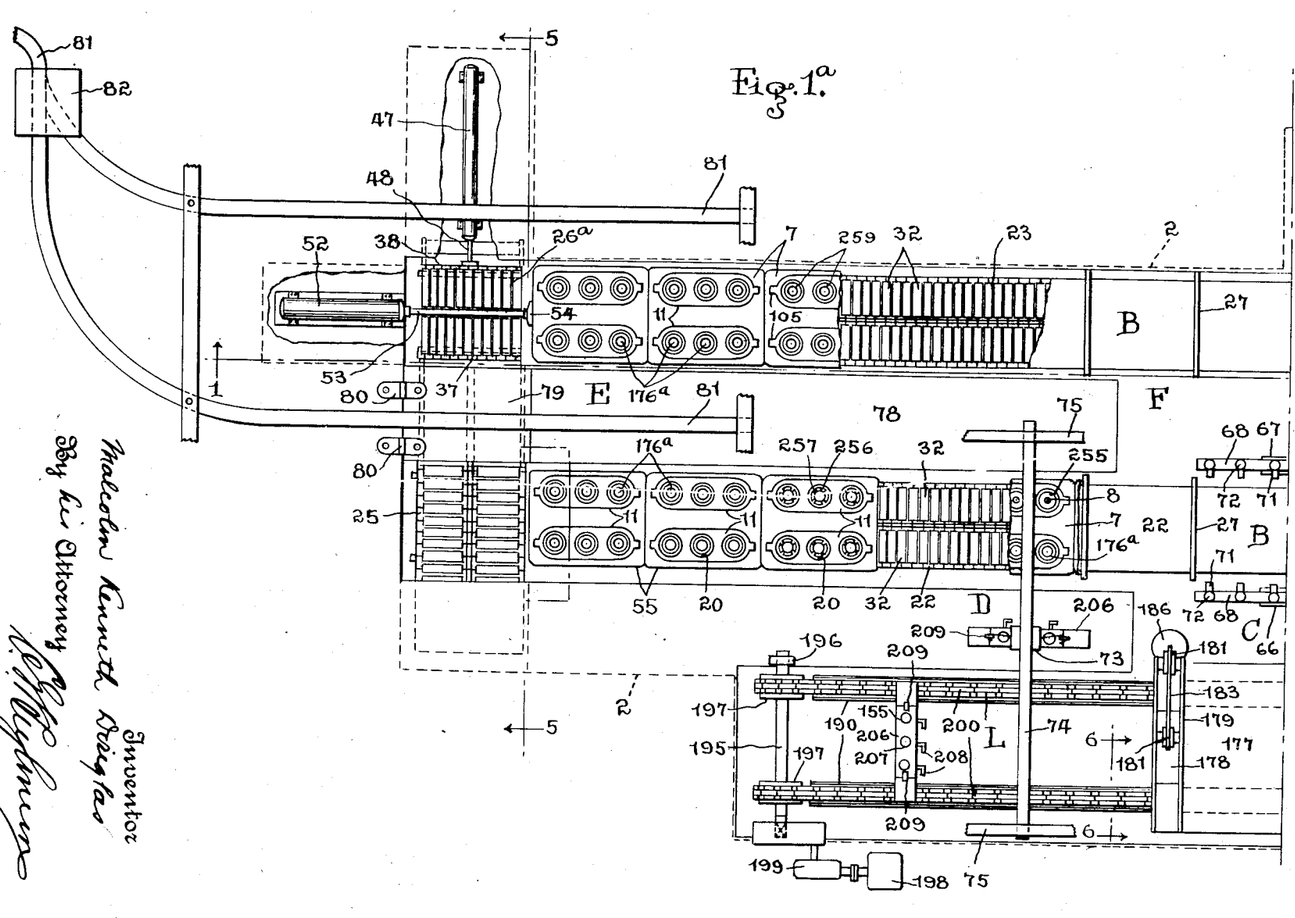
Figure 1B:
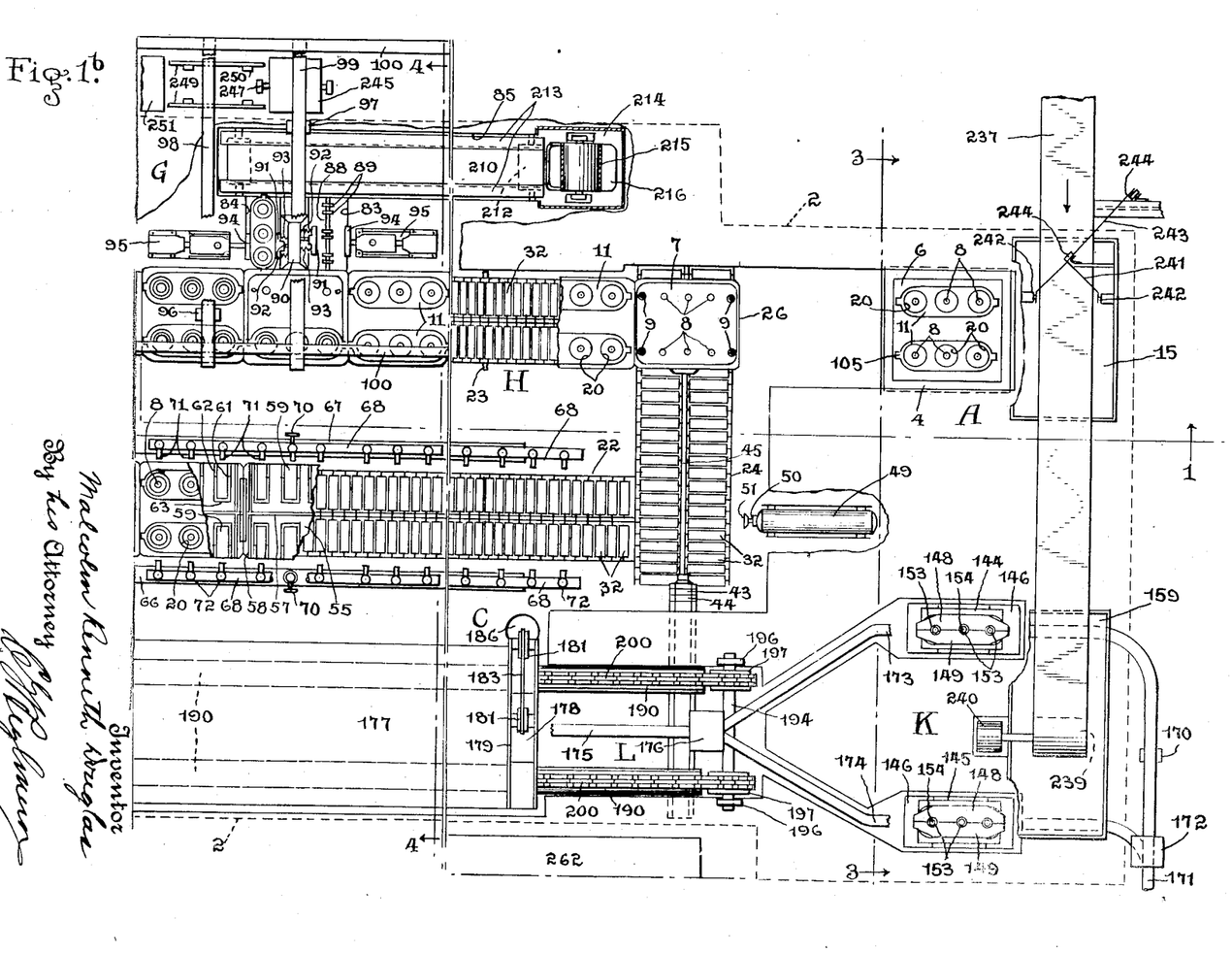

The main operating floor level is indicated at 1, beneath which is a substantially rectangular pit which is indicated in Figs. 1$^a$ and 1$^b$ by the dotted outline 2, and which provides a sub-floor level comprising a foundation or base 3 for supporting the majority of the interrelated elements of the plant structure.

Figures 9, 11:
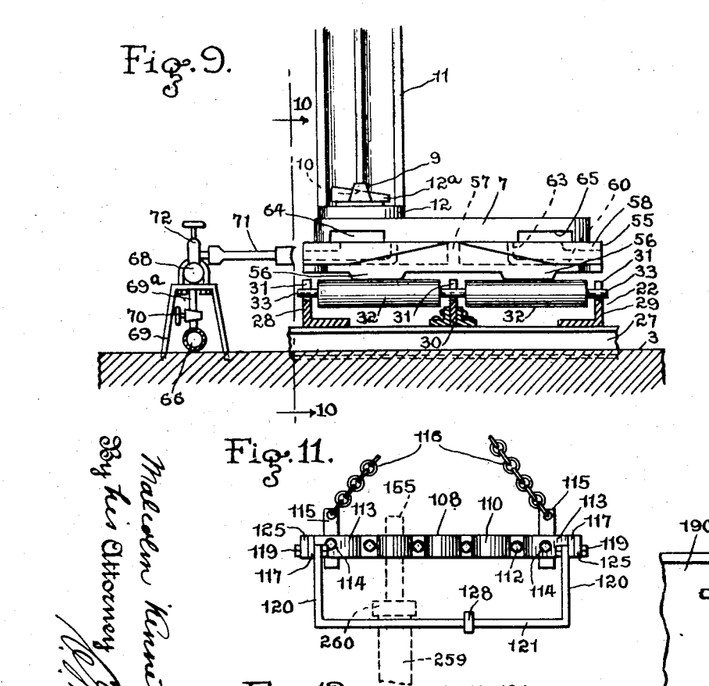
Fig. 9 is a detail on an enlarged scale of certain of the apparatus shown in Fig. 4.
Figs. 11 and 12 are side and plan views respectively of certain apparatus employed in the plant operation.
Figure 10:
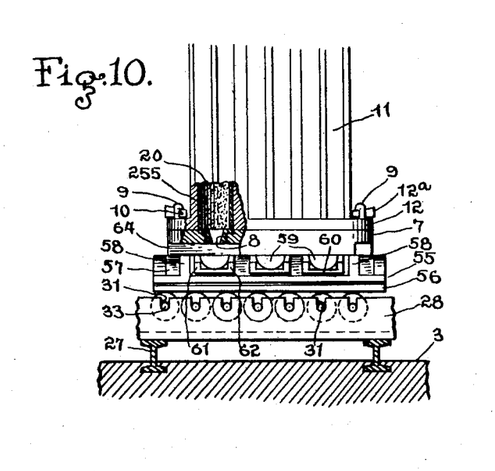
Fig. 10 is a view on the line 10—10 of Fig. 9.

At the mold making station A is a jolt machine, or the like 4, mounted rigidly on the foundation 3 and having a suitably constructed sub-foundation 5 which will withstand the jarring impacts of the machine 4. Rigidly secured on the horizontal top or supporting face of the machine 4, is a base or bottom plate or member 6 for receiving a flask body, a similar plate being shown in top plan view on the cross-over car of the conveyor means B in Fig. 1b and designated 7, each of the bottom members 6, 7 having apertures 8 therethrough spaced to aline axially with the cylindrical mold bores in the flask bodies. The machine 4 and the plate 6 preferably accommodate a pair of flask bodies, as is clearly shown in Figs. 1b and 3. Projecting upward from the plates 6, 7 at each end of the parallel rows of alined apertures 8, is a post or pin 9 having a longitudinal or vertical wedge receiving slot 10 therethrough (see Figs. 9 and 10). The bottom plate 6 receives a flask body or bodies 11 in which the molds are to be formed. The flask bodies 11 have base flanges 12 provided with apertures which fit over the pins 9 and are clamped to the member 6 by wedges 12a driven through the slots 10. Supported by a suitable frame structure comprising columns 13 and cross-beams 14 above the floor 1, is a hopper or bin 15 for receiving and storing mold forming material, such as molding sand. The lower delivery end of bin 15 is positioned directly over or above the molding machine 4 and the feed of sand therefrom is controlled by a gate member 16 which is pivotally supported thereon, as at 17. The gate 16 has an operating arm or lever 18 movable in the direction of the arrow, Fig. 2b, to open the chute for delivery therefrom of molding sand. Also supported by the frame structure are pattern bars 19 which may be raised out of the way or lowered by any suitable hoisting means (not shown) into the mold recesses 20 in the flask bodies to seat at their lower ends in apertures 8 (Fig. 1b) through the plate 6. A stripper plate 21, Figs. 2b and 3, cooperates with the pattern bars 19 and is placed on the flask body prior to lowering of the pattern bars into the recesses 20. A sand guide means 21a bridges the space between the adjacent flask bodies on the machine 4 and serves to direct the sand released from hopper 15 into the recesses 20 around the pattern bars 19.

Figure 5:
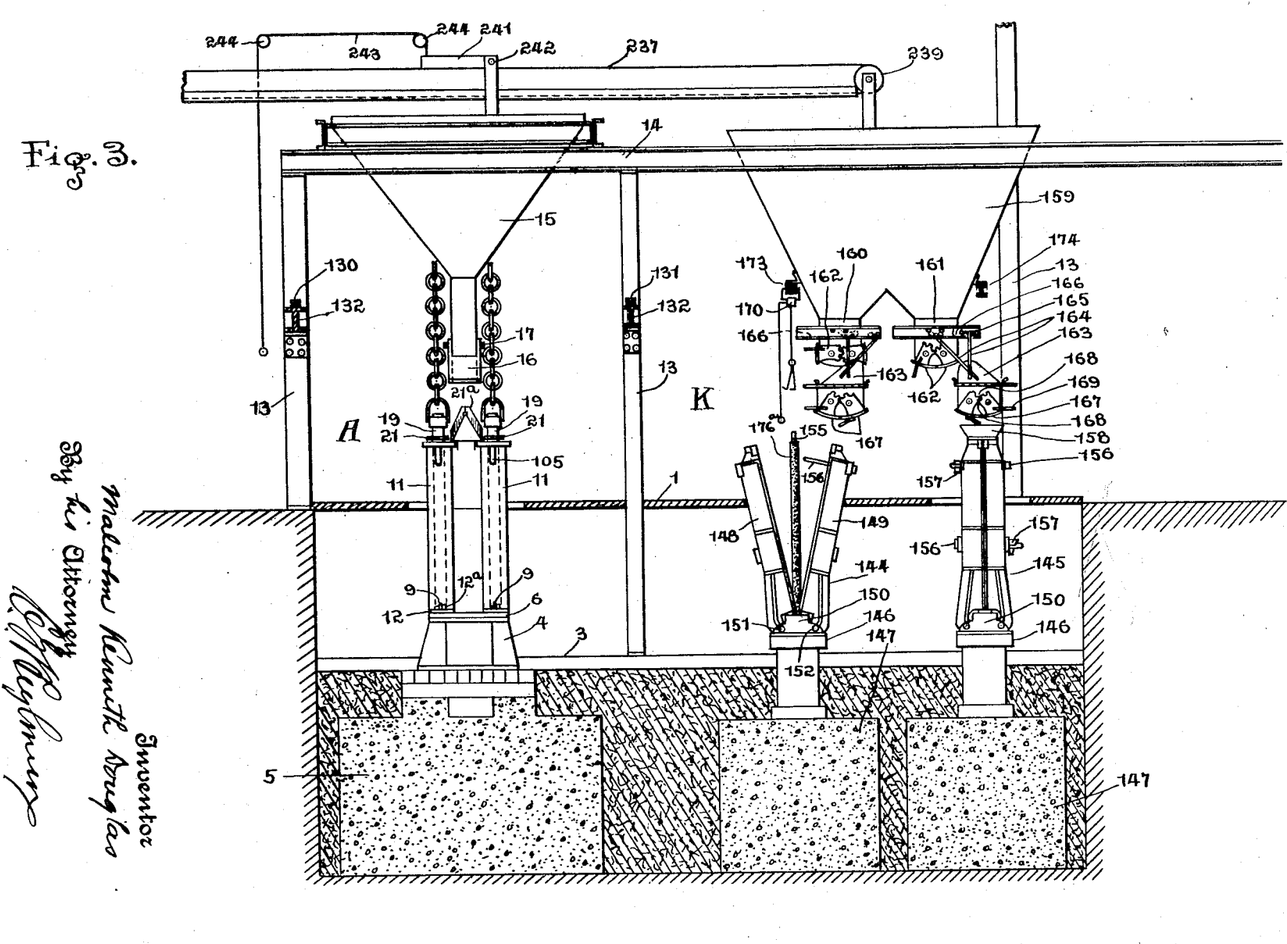
Fig. 5 is a view in vertical section on the line 5—5 of Fig. 1$^a$.

The conveyor means B comprises trackway portions 22, 23 which are preferably substantially parallel and in a common horizontal plane. The ends of the portions 22, 23 are joined by transverse end trackway portions 24, 25 which are preferably substantially parallel to each other and at right angles to the portions 22, 23. The portions 22, 23, 24 and 25 thus provide an endless trackway substantially in the form of a rectangle. On each of the end portions 24, 25 is a cross-over or transfer car or truck 26, 86a. The end trackway portions 24, 25 are set below the horizontal plane of portions 22, 23 so that the supporting surface of the trucks 26, 26a will be substantially flush with the portions 22, 23 (see Figs. 2a and 2b). The trackway portions 22, 23, 24, 25 are preferably supported on the usual cross-ties 27 secured in or to the foundation, and comprise longitudinally extending angle-irons or members 28, 29 which are set with one flange vertical and with the other flange horizontal, the horizontal flanges extending inwardly toward each other (see Fig. 9). Midway laterally between the members 28, 29 is a vertical bearing strip or supporting plate member 30. The members 28, 29 and 30 are all rigidly secured to the ties 27, as by welding, riveting, or the like. In the top horizontal edges of the members 28, 29 and 30 are vertical, transversely alined bearing slots 31, and journaled between the members 28 and 30 and members 29 and 30 are roller members 32 having axles or shafts 33 which seat in the slots 31 and rotatably support the rollers. The roller members 32 are spaced slightly laterally of each other or longitudinally of the trackway portions, as is apparent from Fig. 10, and extend for the full lengths of the portions 22, 23, 24, 25. The crossover or transfer cars or trucks 26, 26a are similar to each other and a description of one will therefore suffice for both. Each truck (see Figs. 1a, 2a and 5) has spaced, longitudinally extending base members 34 which ride on the rollers 32 and have vertical upward end flanges 35, 36. Secured, as by riveting, or the like, to these flanges 35, 36 are transverse, substantially parallel, vertical plate members 37, 38, and midway between and parallel to members 37, 38 is a vertical plate member 39 which is also rigidly fixed to and extends transversely of members 34. In the top edges of the members 37, 38 and 39 are vertical bearing slots 40 alined transversely thereof and which support roller members 41 having axles or shafts 42 journaled in slots 40. The rollers 41 extend transversely of and above the rollers 32 on the trackway portions 24, 25 and parallel to and in the plane of the rollers 32 on the trackway portions 22, 23. The trackway portion 23 is substantially in line with the molding machine 4, and at that end of trackway 24 adjacent portion 22 and substantially in the longitudinal center line thereof, is a horizontal, double-acting power cylinder 43 fixed to the foundation by straps 44 or the like, and preferably operable by compressed air, the pipe connections not being shown, as such power cylinders are well known. Extending from the cylinder 43 is the usual working plunger or piston rod 45 which is secured preferably by a ball and socket joint to a bar member 46 rigidly fixed to the vertical flanges 36 on the truck 26. At the end of trackway portion 25 adjacent portion 23 is a horizontal, double acting power cylinder 47 rigid with the foundation and substantially in the longitudinal center line of trackway portion 25. The piston rod 48 of cylinder 47 is secured to car or truck 26a in the same manner as piston rod 45 is secured to truck 26. In the longitudinal center line of trackway portion 22 adjacent portion 24 but spaced therefrom to permit passage of the transfer car 26, is a horizontal, double-acting power cylinder 49 rigidly fixed to the foundation and having its piston rod 50 at a proper level for moving flask carrying members from the truck 26 onto portion 22. The rod 50 is provided at its free end with a pusher head 51. At the opposite end of the conveyor means and in the longitudinal center line of trackway portion 23, but spaced sufficiently therefrom to permit free movement of the truck 26a is a horizontal, double-acting power cylinder 52 having a piston rod 53 and pusher head 54. The rod 53 is positioned at a proper level to engage flask carrying members on truck 26a to move the same onto trackway portion 23. On the conveyor means B are skids or trucks 55, one for each pair of flask bodies. The skids 55 are rectangular and preferably substantially square, having their under surfaces provided with longitudinally spaced ribs 56 for supporting engagement with the laterally spaced rollers 32 on trackway portions 22, 23 and with rollers 41 on the transfer cars 26, 26a. The top faces of skids 55 have a longitudinal vertical web of flange 57 and transverse spaced flanges 58 on which the bottom plates 7 are supported (see Figs. 9 and 10). The plates 7 are suitably bolted, or otherwise secured to skids 55. On each of the skids 55 are baffle members 59 comprising a base or bottom wall 60 from which rise side walls 61, 62 joined by a rear end wall 63, such that members 59 are substantially in the form of troughs having an end wall. The members 59 have their open ends adjacent the side edges of the skids and extend transversely thereof. The walls 61, 62 and 63 are of a height substantially equal to that of flanges 57, 58, so that the members 59 fit between the bottom plates 7 and the base of the skids 55. The plates 7 have longitudinally extending, open-ended recesses 64, 65 on their under sides, which recesses underlie and communicate with apertures 8 in the plates 7.

The trackway portion 22 extends through the baking zone C where the molds formed in the flask bodies at station A are dried during transmission to the assembly station D. Any suitable drying or baking means may be employed, such, for example, as an oven, but I preferably heat the molds individually. Extending along the trackway portion 22 from a point adjacent the portion 24 and on each side thereof, are conduits 66, 67 for fluid fuel, such as gas, and connected to a source of supply (not shown). Extending parallel to and above conduits 66, 67 are headers 68 which are supported on standards 69 fixed in the foundation 3 (see Fig. 9). The headers 68 are preferably of a length sufficient to service three flask bodies (see Fig. 1b) and are connected to the conduits 66, 67 by pipe risers 69a having control or cut-off valves 70. Extending laterally from the headers 68 are burners 71, preferably of the Bunsen type, which are at the level of and spaced to cooperate with the baffle members 59 and which project as near thereto as practicable without interfering with the movement of the flask bodies so as to direct the flame into the trough of the baffles and up through the apertures 8 into the mold recesses 20. The passages 64, 65 supply air to the interior of the molds and to insure complete combustion of the gas issuing from the burners 71. Each of the burners 71 is provided with a regulating or control valve 72 for adjusting the burner flame. The conduits 66, 67 and the burners supplied thereby terminate substantially at the assembly station D. The flask molds travel intermittently and at an average rate of about one foot a minute, and the baking zone C is sufficiently long so that the molds will be subjected to the baking or drying heat for substantially forty-eight minutes.

From the baking zone C the skids 55 are moved to the assembly zone or station D where the core members, as will be described, are assembled with the flask molds preparatory to pouring at the station or zone E. At the station D is an overhead hoist mechanism 73 supported from a mono-rail 74 for movement transversely of trackway portion 22. The rail 74 is slung beneath transverse end rails 75 for movement longitudinally of the trackway portion 22. Depending from the mechanism 73 is a hoisting cable 76 having a pair of hook members 77 at its free end for a purpose to be described.

Figures 2A, 15:
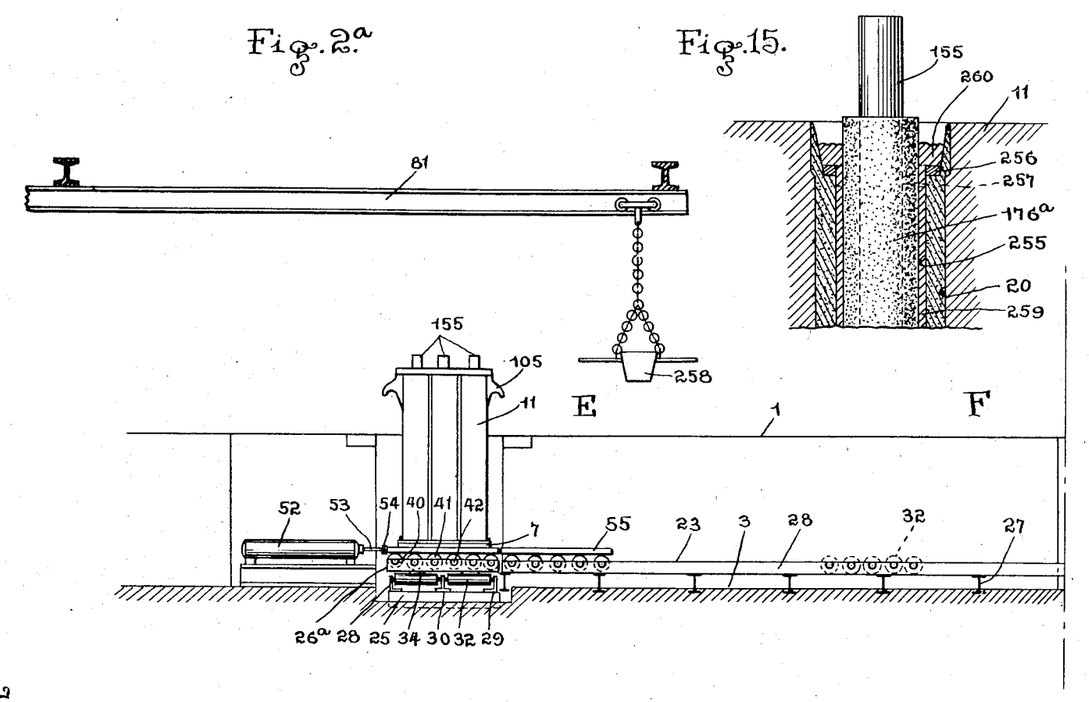

At the end of trackway portions 22, 23 adjacent crossover 25, is the pouring zone E. The main floor is extended over the pit between portions 22, 23, as at 78, and a bridge 79 which swings upward in a vertical plane on hinges 80 extends across trackway portion 25 (Fig. 2a). An overhead trackway 81, preferably a mono-rail, leads from the cupola or other source of molten metal supply (not shown) to the pouring zone. At a point adjacent the pouring zone the trackway 81 preferably branches at a switch 82, so that access may be had to the flask molds at each side of the cars or skids 55.

Figure 4:
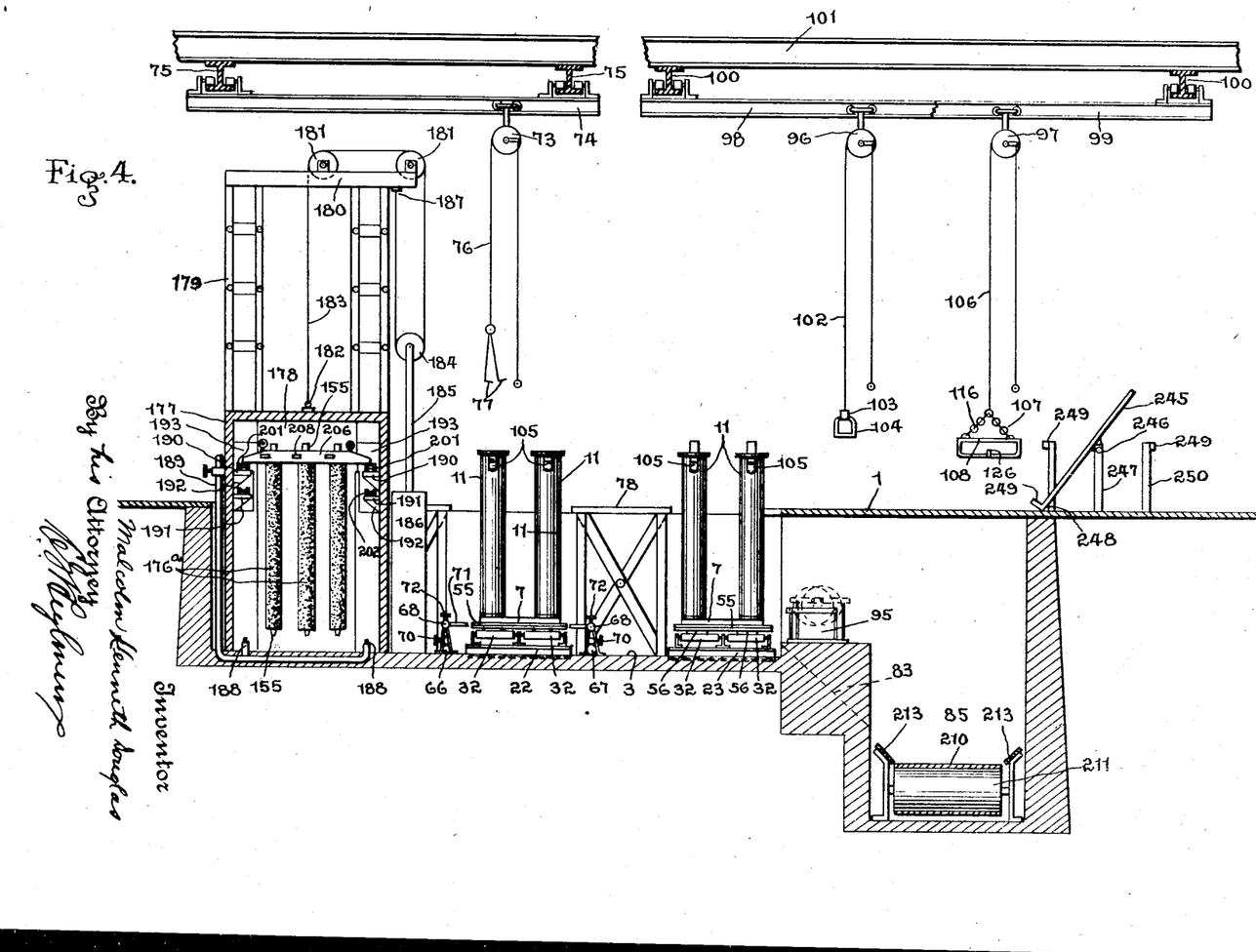
Fig. 4 is a view in vertical section on the line 4—4 of Fig. 1$^b$.
Figure 12:
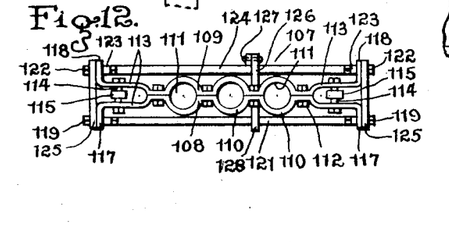

From the pouring zone E, the trackway portion 23 extends through the cooling zone F to the shake-out zone or station G. At the side of the trackway portion 23 are substantially parallel chutes 83, 84, which are inclined downward and transversely away from the portion 23 and which open at their bottom ends into a pit 85 which extends along the trackway portion 23 and substantially to the trackway portion 24. Extending substantially horizontally and longitudinally over the chutes 83, 84 and substantially in the plane of the foundation 3, are laterally spaced grid members 86, 87, each of which is adapted to receive and support a flask body. Each of members 86, 87 comprises a horizontal supporting rod or bar 88 having rigidly secured thereon upwardly extending pairs of fingers or plates 89 which are spaced to cooperate with the mold recesses 20 (Fig. 1b). Between the chutes 83, 84 is a supporting member 90 having substantially horizontally, oppositely projecting bumper heads 91 which are guided for horizontal reciprocation by supporting and guide rods 92 secured in the member 90. The heads 91 are cushioned by spring members 93, preferably helical coil springs, positioned between the heads 91 and the member 90. Cooperating with heads 91 are heads 94 of clamping and vibrating machines 95 which are rigidly fixed to the foundation 3 on the outer sides of the chutes 83, 84. The heads 94 are movable toward heads 91 to clamp a flask body therebetween. When the flask body has been positioned on the grid member 86 or 87 and clamped between heads 91, 94 with recesses 20 positioned over fingers or plates 89 so that the body is supported by the cast articles in recesses 20, then the head 94 is vibrated or reciprocated rapidly to jar or vibrate the flask body to loosen the burnt molding material or sand. Due to the weight of the flask body, as the molding material is loosened, the body will settle to rest on the bar 88 and the plates 89 will force the cast article upward, projecting it partially from its recess 20. At the station G are overhead hoists 96, 97 which are supported from rails 98, 99 respectively, for travel transversely of the trackway portion 23. The rails 98, 99 are slung on rollers beneath supporting rails 100 for travel longitudinally of the trackway portion 23, the rails 100 being supported and fixed to overhead beams 101 (see Fig. 4). Secured to the free end of a hoisting cable 102 of hoist 96 is a balanced bar member 103 having at its opposite ends pivotally supported depending stirrups or hooks 104 swingable in a vertical plane. The stirrups 104 cooperate with lugs or hooks 105 at the top ends of the flask bodies 11. The hoist 96 serves to lift the flask bodies from the plates 7 and transfer them to the grid member supports 86, 87, and to return the empty flask bodies after shaking out, to the plates 7. Secured to the free end of hoisting cable 106 of hoist 97 is a puller member 107 for a purpose to be described and which is shown in detail in Figs. 11 and 12. The member 107 comprises bar members 108, 109 having semi-annular recesses in facing relation which cooperate to form annular collars 110. The circular apertures 111 formed by collars 110 are spaced to aline with the mold cavities or recesses 20. The members 108, 109 are preferably secured together between collars 110 by bolts 112, or the like. Adjacent their ends the members 108, 109 are extended in substantially parallel spaced relation, as at 113, to receive transverse pins 114 on which are pivotally supported links 115 connected by a chain, or the like, 116 to each other and to the cable 106. The extremities of members 108, 109 extend transversely to and outward from their common longitudinal center line, as at 117, 118 respectively. Depending from the extremities 117 and pivotally secured thereto by bolts 119, are arms 120 which are joined rigidly at their free ends by a longitudinally extending bar member 121. Depending from the extremities 118 and pivotally secured thereto by bolts 122, are arm members 123 of a length equal to arm members 120 and which are rigidly joined at their free ends by a longitudinally extending bar member 124. When members 121 and 124 hang freely from members 108, 109, it is apparent that they will be in substantially parallel spaced relation. Reinforcing bars or plates 125 are preferably secured to and between the ends 117, 118 by the bolts 119, 122. A locking or latch member 126 may be pivoted on member 124, as at 127, and is of a length to extend between members 121, 124 when they are in parallel relation, and has a hooked end 128 to cooperate with member 121 to prevent movement of members 121, 124 outward from parallel relation.

Figures 5, 16:
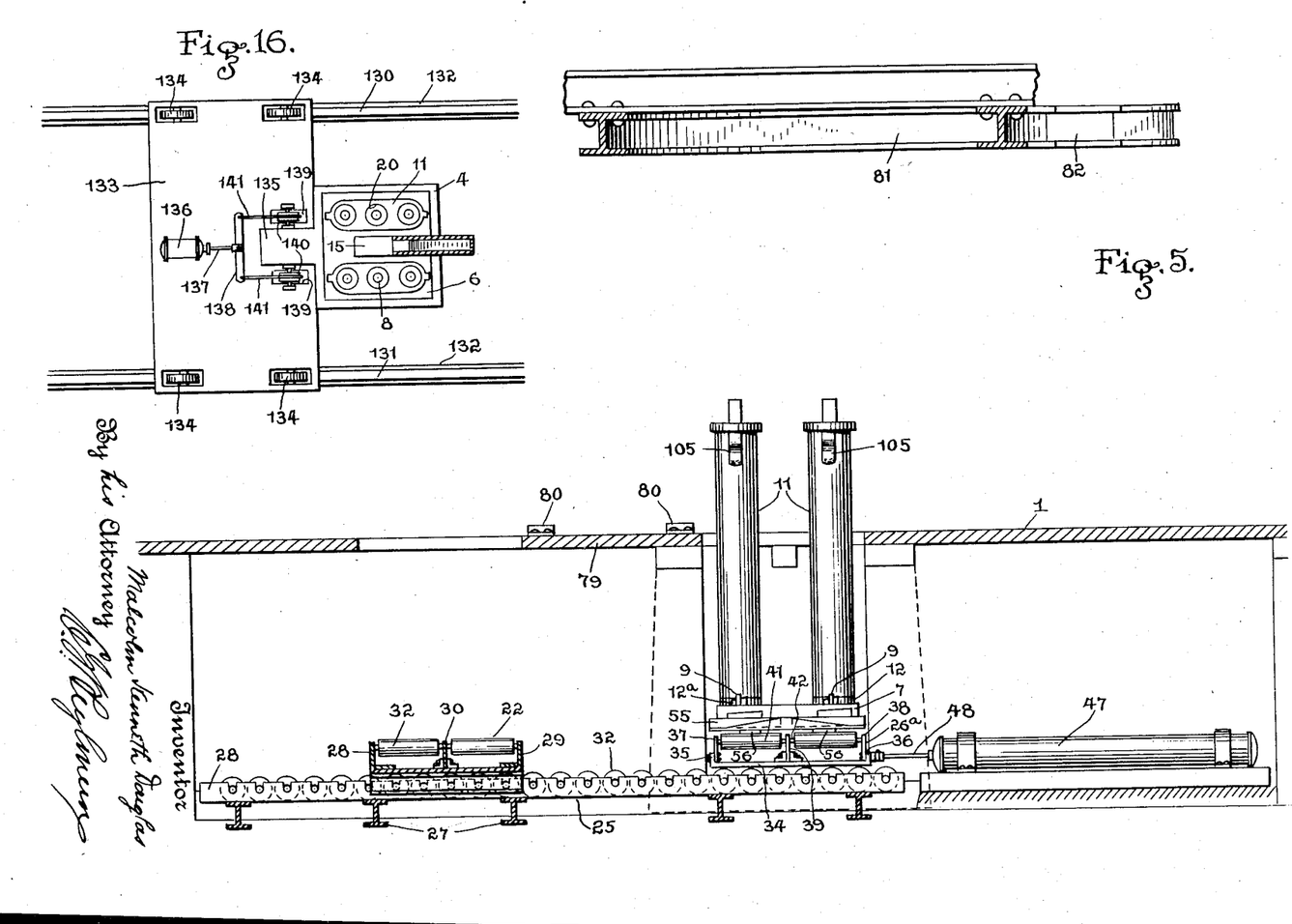
Fig. 16 is a top plan view of certain conveyor means employed in my apparatus.

Overlying the trackway portion 23 and in substantial alinement therewith (Figs. 2$^b$ and 16), is an overhead trackway 129 having spaced parallel tracks 130, 131 supported on horizontal beams 132 carried by the columns 13 and extending from the trackway portion 23 adjacent portion 24 over the station A. On the rails 130, 131 is a hoisting truck or car 133 having rail engaging wheels 134. The car 133 is recessed, as at 135, at its front edge so that the front edge of the car may move beyond the chute 15, the chute passing into the recess 135, as the car is moved over the machine 4. On the car 133 is a horizontally positioned power cylinder 136 operable from the main floor level and having a piston rod 137 to the free end of which is pivoted a cross arm 138. Adjacent the sides of the recess 135 are apertures 139 through the truck or car and over which are positioned guide pulleys or rollers 140 which receive cables, or the like, 141, each being secured at one end to the respective ends of the arm 138 and extending through the apertures 139. At the free end of each cable 141 is a bar member 142 secured thereto at its midpoint and from the ends of which pivotally depend hooks or stirrups 143 for cooperable engagement with the lugs or hooks 105 on the flask bodies.

As above noted, the core making station K (see Figs. 1$^b$ and 3) is preferably located adjacent the station A. At the station K are a pair of core member forming machines 144, 145, which are supported on suitable jolt machines 146, which may be of any suitable type which will shake and pack the core forming material in the core forming cavities and which are secured to the foundation 3 and have suitable sub-foundations 147 to withstand the jarring shocks of the machines 146. The core machines 144, 145 are substantially identical, and therefore a description of one will suffice for both. The machine 144 is shown in open position to which it is moved for receiving core arbors and for removal of the formed core members, while the machine 145 is shown in closed core member forming position. The machine 144 or 145 comprises members 148, 149 hinged to a base member 150 at their lower ends on horizontal shafts, as at 151, 152 respectively, and having cooperable, vertically extending recesses, which when the members 148, 149 are in closed engagement complete the core prints, designated 153. In the base members 150 are sockets 154 coaxial with prints 153 for centering the lower ends of core arbor members 155. The top ends of the members 155 may be centered by a spider, or the like (not shown). When the members 148, 149 have been moved into closed position, the arbor members first having been set therein, the members 148, 149 are locked tightly together by bolts or bars 156 and wedges 157. A funnel member 158, shown in position on the machine 145, may be used to guide the core forming material or sand into the prints 153 around the arbor members. Supported above the machines 144, 145 by the beams 14, is a hopper or bin 159 for storing the core sand and which has delivery chutes 160, 161 positioned laterally of and respectively for the machines 144, 145. The chutes 160, 161 each have control gates 162 and a measuring bucket or container 163 which may be supported at each side from arms 164 having rollers 165 travelling on trackways 166 secured to opposite sides of the chutes so that the buckets may be moved from beneath the chutes into position directly over the machines 144, 145. The bottom of each container 163 is formed by gates 167 which are geared together, as at 168 and are movable by a hand lever 169 into parting relation to feed core sand from the container into the prints 153. The machines 144, 145 are supplied with core arbor members 155 by a travelling hoist 170 movable along an overhead trackway 171 which branches at a switch 172 into parallel paths 173, 174 for delivery of members 155 to each machine. The double trackway portion 173, 174 merges on the opposite side of the machines into a single overhead track 175 at a switch 176, the single track 175 leading to the baking zone C for delivery of the completed core members 176$^a$ thereto.

Figure 6:
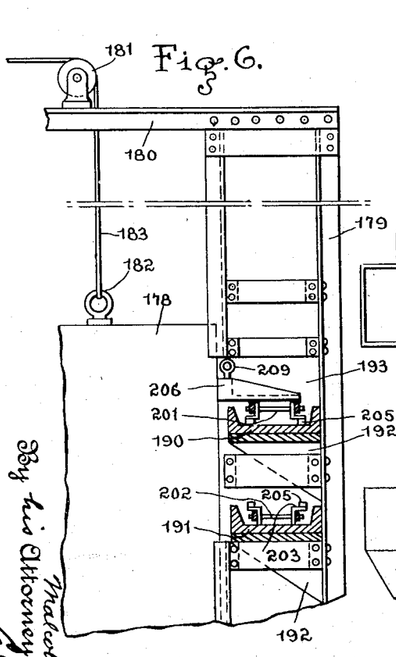
Fig. 6 is a detail view in vertical section on the line 6—6 of Fig. 1$^a$.
Figures 13, 14:
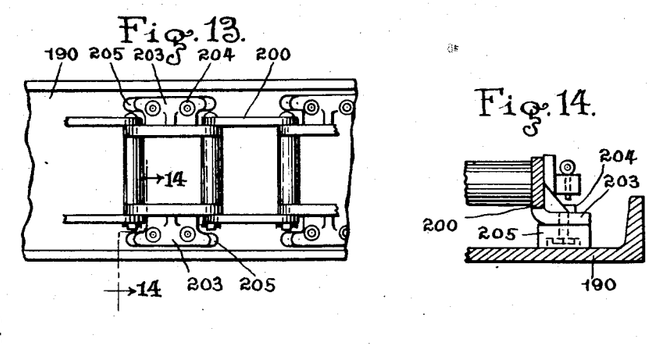
Fig. 13 is a detail plan view of certain conveyor means.
Fig. 14 is a view in section on the line 14—14 of Fig. 13.

At the zone C, I preferably provide for the core members a drying or baking oven 177 which extends parallel to trackway portion 22 and terminates at the assembly zone D. The oven 177 is substantially rectangular in vertical cross-section, and has at its opposite ends vertically moving doors 178 (see Figs. 4 and 6) which are supported and guided in vertical end frameworks 179. Each framework 179 has a horizontal top cross member 180 which supports guide pulleys 181. To each door 178 is connected, as at 182, a cable 183 which is passed over the pulleys 181 and around a pulley 184 carried by the free end of a plunger or piston rod 185 of a vertically positioned power cylinder 186, the free end of each cable 183 being fixed, as at 187, to its cross-member 180. The oven 177 is preferably heated by burners 188 fed with fuel, such as gas, from a valve controlled conduit 189. Extending longitudinally through the oven 177 at each side thereof are upper and lower conveyor chain supporting members 190, 191, preferably channel-irons, having their flanges extending upward from the web. The members 190, 191 are rigidly supported, as by angle-irons 192, from the side walls of the oven and extend through apertures 193 in the end walls of the oven at the sides of the doors 178, the apertures 193 opening into the doorways. The members 190, 191 extend on suitable supporting structure from the entrance end of the oven to a point beneath the overhead switch 176 and are positioned substantially equidistant laterally from the overhead rail 175. From the exit end of the oven the members 190, 191 extend on suitable supporting structure through the assembly zone D and substantially to the pouring zone E. At the ends of the members 190, 191 and positioned midway vertically therebetween, are horizontal shafts 194, 195 journaled in suitable end bearing blocks 196 mounted on the main working floor. Fixed on shafts 194, 195 in vertical alinement with channels 190 are sprockets 197. The shaft 195 at the exit end of the oven is driven by a motor 198. Between the motor 198 and shaft 195 is interposed a suitably housed speed reduction gearing 199. Supported on the members 190, 191 are similar conveyor chains 200 (see Figs. 13 and 14) which are passed over the sprockets 197 and driven by shaft 195. The channel members 190 carry the top or supporting flights 201 of chains 200, and the members 191 carry the bottom or return flights 202. Certain of the links of the chains 200 are provided with outwardly projecting flanges 203 to the under faces of which are removably secured by bolts 204 wear blocks or shoes 205 which take the frictional wear of the chains on the members 190, 191 and which may be readily replaced when worn down, thus saving the chain. Core arbor supporting members 206 (Figs. 1a, 4 and 6) of a length to bridge the space between and rest at their ends upon the top flights 201 of chains 200 have vertical apertures 207 therethrough, in which are removably positioned and locked by pins 208, or the like, the top ends of the core arbor members 155. Secured to the members 206 adjacent the ends thereof and rising from the top faces, are eye bolts, or the like, 209, for engagement by the hooks of the overhead hoists for transfer of the core members to and from the oven conveyor L. The mono-rail 74 of hoist mechanism 73, above described, extends transversely over the conveyor means L so that the core members may be picked up thereby for assembly with the flask molds.

The conveyor system for the mold and core forming materials or sands will now be described. In the pit 85 is a conveyor 210 supported by main end rollers 211, 212, and preferably of the belt type, driven by any suitable means, such as an electric motor (not shown). Extending longitudinally of the belt 210 and at the sides and over the top flight thereof, are guide plates 213 which serve to direct the burnt or used molding sand from the chutes 83, 84 onto the belt 210 and to maintain the sand thereon during travel of the belt. At the delivery end of the belt 210 is an elevator 214 driven by a motor, or the like (not shown), comprising a belt 215 having cups or scoops 216 which deposit the used molding sand onto the top flight of a horizontal overhead conveyor belt 217 having end supporting pulleys 218, 219, the pulley 219 being driven by a motor 220. At the delivery end of the belt 217 and beneath pulley 219 is a chute 221 which directs or feeds the sand into a horizontally positioned cylindrical rotating sifting barrel 222. Beneath the barrel 222 is a hopper 223 from which leads a chute 224 having a control gate 225 and delivering into a sand mixer 226 where the used sand is mixed with new sand. In the bottom of the mixer 226 is a gate controlled aperture 227 for controlling the delivery of sand from the mixer onto a belt conveyor 228 having end rollers 229, 230 and guide rollers 231, the belt 228 being driven by a motor (not shown). The conveyor 228 feeds the sand to a paddle mixer 232 which delivers into a revivifier 233. From the revivifier 233 the prepared sand drops into a pit 234 in which is positioned the lower end of an elevator 235, preferably of the belt type, having scoops 236 for lifting the sand onto a conveyor belt 237 having end supporting pulleys 238, 239, of which the pulley 239 is driven by a motor 240. The belt 237 extends across and over the hopper 15 at mold-making station A and terminates at the pulley 239 over hopper 159 at core-making station K. Cooperating with the top flight of belt 237 over the bin or hopper 15, is a plow member 241 pivotally supported on bearing pins 242 for vertical movement to position the same in or out of contact with belt 237, so that mold or core forming material or sand may be passed into the bin 15 or the bin 159. When core forming material or sand is prepared in mixer 226, the gate 225 is held closed and plow member 241 is held in raised position by a pull wire or cable 243 guided over pulleys 244 to permit the core sand to pass to bin 159. When mold-forming material or sand is being prepared in mixer 226, the gate 225 is held open and the plow member 241 is lowered to sweep the sand from the belt 237 into the bin 15.

At the shake-out station G on the main floor level, is a tilt table or transfer platform 245, preferably positioned laterally of trackway portion 23 and beyond and substantially in line with the shake-out machines but within range of travel of hoist 97. The platform 245 is pivotally supported at its side edges, as at 246, on supporting posts 247. The axis of rotation of the platform 245 is preferably substantially parallel to the trackway portion 23 and offset from the center of weight of the platform, so that the platform will normally stand in inclined position with one end thereof, as at 248, engaging the main floor. The end 248 is provided with a flange or end wall 249 which serves as a stop means and extends upward and at substantially right angles to the plane of the platform 245. Terminating closely adjacent the platform 245 are substantially parallel rails 249 rigidly supported on posts or columns 250 such that the plane of the top of rails 249 at the platform will be substantially in the plane of the platform 245 when the platform has been tipped or tilted to horizontal position. The rails 249 extend substantially parallel to trackway portion 23 and are inclined slightly downward from the platform 245 to their delivery ends, at which is positioned a shake-out machine 251 which may be of any suitable type for shaking or jolting the core sand and core arbor members from the cast articles.

The operation of the plant is as follows: The burners 71 for drying or baking the flask molds and the burners 188 for heating the core oven 177 are turned on and ignited. The hoppers or bins 15 and 159 are filled and maintained supplied with molding and core sand respectively from the sand preparing or handling station M. The cupola or other source of molten metal supply is placed in operation to produce molten metal for the casting of the articles. The formation of molds in the flasks 11 and of core members on the arbor members 155 is continuous and the two operations are carried on simultaneously at the stations A and K respectively. The hoist car 133 is moved by an operator along the trackway 129 to a position over the pair of empty flasks 11 which are on the end skid 55 on the cross-over car 26. These and the other empty flasks 11 which are on portion 23 are not secured to the bottom plates 7 by the wedges 12ª. The manual compressed air control (not shown) for the cylinder 136 is moved to cause the cables 141 and the stirrups 143 to be lowered, the stirrups then being hooked under the flask lugs or hooks 105. The flasks are then lifted by the power cylinder 136 and transferred by the car 133 to a position over the bottom plate 6 on the machine 4 at station A and lowered with the apertures in the bottom flanges 12 of the flasks receiving their respective sets of pins 9. Wedges 12ª are driven through apertures 10 in pins 9 to tightly clamp the flasks to the machine 4. A stripper plate 21 is placed on each flask body 11 and patterns 19 are lowered through plates 21 into the flask recesses 20 with the lower ends of the patterns seating and being centered in apertures 8 in the plate 6. The sand guide 21ª is placed on the tops of the flask bodies 11 and the gate 16 opened to deliver a quantity of molding sand into the recesses 20 around the pattern bars 19. The jolt machine 4 is placed in operation and additional molding sand is fed from hopper 15 into the pair of flasks until the mold print is completed, the same being indicated at 255 in Figs. 10 and 15, particularly. The sand guide 21ª is removed and the patterns 19 are drawn by a hoist (not shown), after which the stripper plate 21 is removed. These flasks 11 containing the completed mold prints 255 are unclamped from the plate 6, picked up by the hoist 136, returned to the bottom plate 7 on the transfer car 26 and tightly clamped thereto by wedges 12ª. The power cylinder 43 is operated to draw or move the car 26 along trackway portion 24 until the skid 55 carried thereby is in line with trackway portion 22. The transfer car 26ª if not already in line with trackway portion 22, is moved thereinto by the power cylinder 47 to receive a skid 55 and the flask bodies 11 carried thereby. The power cylinder 49 is operated to bring the pusher head 51 against the skid 55 on transfer car 26 and to move the skid and its completed flask molds onto trackway portion 22. As the skid 55 is moved from car 26 onto trackway portion 22, a skid 55 will be moved from portion 22 onto car 26ª by engagement of skids 55 with one another, the trackway portion 22 being filled with skids in end engagement. As the flask molds are completed at station A, they are similarly delivered to and moved onto and along trackway portion 22 by the power cylinders. As the flasks 11 are moved along trackway portion 22 through the baking zone C, they take position during the intervals between delivery of molds from station A at points where the burners 71 will be in line with baffles 59 (see Fig. 1ᵇ). The hot products of combustion are guided by the baffles 59 to points beneath each mold cavity 20 and from which they rise through apertures 8 into the cavities, drying the hollow cylindrical sand prints 255. I have found that satisfactory castings may be produced when the sand print 255 is "skin dried," i. e., dried or baked hard to a small portion of the depth of the sand forming the print. The molds are properly dried when they leave the zone C and arrive at the assembly zone D.

The formation of the core members 176ª at station K, as noted above, is carried on simultaneously with the making of the flask molds. The members 148, 149 of core machines 144, 145 are unlocked and separated and the prints or cavities 153 cleaned, as for example by kerosene and air under pressure. Arbor members 155 are secured in a carrier 206 by the pins 207, and are then cleaned and coated with a paste, preferably comprised of kordax and water. The carrier 206 and the depending arbor members 155 are picked up by the hoist 170 and manually moved along trackway 171 either to the machines 144 or 145. The arbor carrier and members 155 are lowered until the lower ends of members 155 seat in the sockets 154 in base plate 150. The members 148, 149 are moved into engaging relation and the wedges 157 driven through pins or bars 156 to tightly clamp the members 148, 149 together. The arbor carrier 206 is removed and a core arbor spider (not shown) is positioned on the top of the closed core box to center the arbors at their upper ends. The funnel 158 is then placed on the box to guide the core sand into the annular recess around the arbor members 155. Bucket 163 is positioned beneath its chute 160 or 161 and the gates 162 are opened to permit delivery of sand from hopper 159 into the bucket. The filled bucket is then moved over the closed core box and the core sand fed into the funnel 158 by the control gates 167 as the machine 146 is placed in operation to jolt and pack the sand tightly around the arbor members in the core prints. When the core prints are filled, the funnel and spider are removed, the carrier is replaced and locked on the members 155, the wedges 157 are driven out, and the box is opened. The hooks of hoist 170 are engaged with the eye bolts 209 on the carrier 206, the completed core members 176ª are lifted from the open box and the hoist is moved through switch 176 to trackway 175 over the conveyor means L. Here the core members are preferably sprayed with a solution of plumbago, glutrin and water, after which the carrier 206 is lowered until its ends rest upon the spaced upper flights 201 of conveyor chains 200 with the core members 176ª depending therebetween. The power cylinders 186 are operated to raise or open the doors 178 of oven 177 and the motor 198 is energized to advance the conveyor L to move the core members into the oven. As a set of core members moves into oven 177, a set of dried core members emerges from the exit end of the oven which is at the assembly station D. When the new core members have been moved into the oven the motor 198 is stopped and the cylinders 186 are operated to lower or close the core oven doors 178. I have found that with a temperature between 400° F. and 425° F. that the core members will be properly dried or baked in substantially three hours time. It is therefore to be noted that the formation and supply of core members to the oven 177 must be commenced prior to the formation of molds, but once the system has been placed in step, i. e., completed and dried core members delivered to station D as the completed and dried flask molds are delivered to station D, then the operation of the plant is substantially continuous and the speed of production is only limited by the capacity of the operators.

The dried core members 176ª are picked up by hoist 73 at station D, the hooks 77 being engaged in eyelets 209. The hoist 73 is moved on trackways 74 and 75 to position and accurately center a set of dried core members over a set of dried flask molds at station D. The core members are lowered by hoist 73 until the lower ends of arbor members 155 seat in the apertures 8 which center the lower ends of the core members 176ª in the sand prints 255. The arbor carrier 206 is released and removed from core members 176ª and returned by a truck, or the like, to the station K. Ring members 256 (Fig. 15) are placed on the top of the sand prints 255, the members 256 having spaced fingers 257 about their inner circumferences which engage the top ends of the core members 176ª and serve to center the same at the top of the prints 255. The molds are now ready for pouring, the above steps at the assembly zone or station D being performed during the intervals between the feeding of new molds to trackway portion 22.

As above noted, the pouring station E occupies the area at the common ends of trackway portions 22 and 23 beyond the station D, or to the left of Fig. 1ª. The molten metal is carried from the cupola in a ladle 258 supported from the mono-rail 81 and may be moved along either branch thereof from the switch 82. The molds are poured either before or after transfer to trackway portion 23 and the prints 255 are filled with molten metal, indicated at 259, Fig. 15, to a point above the ring member 256 to provide an annular flange 260 when the metal has set and for a purpose to be described. As skids 55 are moved intermittently along the trackway portion 22 by power cylinder 49, the car 26ª is positioned by the power cylinder 47 to receive the skids and their flasks. When a skid has been moved onto truck 26ª, the cylinder 47 is operated to move the truck and skid into line with trackway portion 23. The trackway portion 23 being completely filled with skids 55, the empty car or truck 26 is moved by cylinder 43 into line with trackway portion 23, and then the power cylinder 52 is operated to cause pusher head 54 to engage the skid on car 26ª to move the same onto trackway portion 23, this operation moving a skid from portion 23 onto car 26. The poured molds are progressively moved along trackway portion 23 as new skids and molds are fed thereto. As the poured molds leave the station E they are moved through a cooling zone F which is of sufficient length so that the molten metal will have set by the time the molds arrive at the shake-out zone or station G.

At station G an operator drives the wedges 12ª from pins 9, thus unlocking the mold flasks 11 from plates 7 and skids 55. The hoist 96 is moved over one of the loosened flasks, the stirrups 104 are hooked under the flask lugs 105 and the flask is lifted by the hoist and transferred to a position over grid 86 of the shake-out machine. The flask 11 is lowered by hoist 96 with recesses 20 in vertical alinement with fingers or plates 89 so that the flask body is supported above bar 88 by the baked sand and the cast articles in recess 20. The hoist 96 is released from the flask body and returned to position over trackway portion 23. A second flask is then picked up by hoist 96 and similarly set on grid 87. The heads 94 of machines 95 are moved inwardly to clamp the flask bodies 11 against heads 91 and the machines are then set in operation to vibrate or jolt the flasks which loosens the burnt molding sand around the cast articles and permits the flasks to settle onto the rods 88, thus forcing the cast articles upward and bringing the annular flanges 260 above the top faces of the flask bodies 11. The burnt molding sand falls into the chutes 83, 84 and from thence to the belt 210 for transfer, as above described, to the station M. When the cast articles have been loosened from the flask bodies 11, the hoist 97 is moved over the flasks, puller means 107 is lowered, and the bars 121, 124 are swung under opposite sides of flanges 260, see Fig. 11, and clamped in place by latch 126. The hoist 97 is operated while continuing the shaking-out operation and draws the cast articles, designated 259, Figs. 11 and 15, with the core arbors 155 which have not been shaken out, from the recesses 20. The hoist 97 is then moved to position over table or platform 245 and the cast articles 259 are lowered thereonto with the table flange 249, preventing the cast tubular articles 259 from sliding endwise off the platform. The member 107 is released and removed from articles 259, the platform is tilted to horizontal position, and the articles 259 are rolled onto rails 249. The articles 259 move by gravity along the inclined rails 249 and onto shake-out machine 251. At the machine 251 the core arbors 155 are shaken from the articles 259 and are transferred by a truck, or the like, to a cooling tank 262 filled with water, preferably positioned adjacent station K, and in which the members 155 are immersed to expedite cooling thereof. After cooling in the tank 262 the members 155 are removed therefrom and cleaned and coated with kordax and water, as above described, when they are again ready for use in machines 144, 145.

The empty flasks which are supported on the bars 88 at the shake-out station, are released from the machines 95, picked up by hoist 96 and set down on the empty skid 55, which is still at station G and from which the flasks were removed for shaking out. The empty flasks returned to skids 55 from the shake-out station G, are delivered to the car 26 as the flasks are moved onto trackway portion 23 by cylinder 52. When the flasks are removed from the bottom plate 7 on car 26 to station A, the empty plate 7 is cleaned and prepared for the flask mold which is being formed at station A, which completes a cycle of operation of the plant.

What I claim and desire to secure by Letters Patent of the United States is:

1. In a casting operation, the method of removing cast tubular articles from flasks in which a ring of metal provides a downward facing shoulder around the core arbor member above the cast article, which comprises positioning a poured and cooled flask on a shake-out device, positioning a puller means beneath the ring of metal, shaking the flask to loosen the burnt mold-forming material, and pulling on the puller means to withdraw the cast article from the flask.

2. In a casting operation, the method of shaking out a cast tubular article in which a ring of metal provides a downward facing shoulder around the core arbor member above the cast article, which comprises positioning a poured and cooled flask on a shake-out device, positioning a puller means beneath the ring of metal, shaking the flask to loosen the burnt mold-forming material, pulling on the puller means to withdraw the cast article from the flask, placing the cast article with its contained core arbor member on a second shake-out device, and then shaking the cast article to loosen the burnt core-forming material whereby the core arbor member may be withdrawn from the cast article.

3. In a plant for the manufacture of cast tubular articles, a trackway for conveying flask molds, a gas main extending along said trackway, burners extending horizontally toward said trackway, flask mold supporting members movable along said trackway, and means carried by said members to direct the flame from said burners through the molds on said members thereby to dry or bake the molds.

4. In the manufacture of vertically cast pipe, the method of preparing a core member for assembly in a preformed vertical pipe mold which comprises applying core forming material to a vertically positioned core arbor member to provide a core member, transferring the core member while in vertical position to conveyor means, and then supporting the core member in vertical depending position on the conveyor means for travel in vertical position through a drying or baking zone.

5. In the manufacture of vertically cast pipe, the method of preparing a core member for assembly in a preformed vertical pipe mold which comprises applying core forming material to a vertically positioned core arbor member to provide a core member, securing a carrier member to the top end of the vertically positioned arbor member, transferring the vertically positioned core member by the carrier member to a conveyor means, positioning the carrier member on the conveyor means with the core member in substantially vertical depending position, moving the depending core member by the conveyor means through a drying or baking zone, and then vertically lifting the dried or baked core member by the carrier member for positioning in a preformed vertical pipe mold.

6. An apparatus for drying vertically positioned pipe molds, comprising a supporting member, a bottom plate mounted on said member and having an aperture therethrough, guiding means positioned between said plate and said member for directing combustion products through said aperture, and a vertical pipe flask secured to said bottom plate and containing a mold having its cavity registering with said aperture.

7. An apparatus for drying the mold forming material in a vertically positioned flask mold, comprising a flask supporting member, a flask bottom plate fixed to said member in overlying vertically spaced relation thereto, said plate having an aperture therethrough for the passage of combustion products to the interior of a flask mold to be mounted on said plate, a burner operable to discharge combustion products into the space between said plate and said supporting member, and baffle means for guiding the combustion products through said aperture.

8. The method of shaking out vertically cast pipe from a mold flask which comprises vertically positioning a flask and its contained cast pipe upon an upward extending supporting member of a size to pass within the flask cavity, vibrating the flask to loosen the burnt mold forming material whereby the flask moves downward by force of gravity relative to the supported pipe, and then lifting the loosened cast pipe out of the flask cavity.

9. In a plant for the manufacture of vertically cast tubular articles, an endless trackway, means movable on said trackway for conveying flask molds through a cycle of molding operations, a flask bottom plate rigidly secured to said movable means, a flask supported on said plate, and means rigidly securing said flask to said plate.

10. In a plant for the manufacture of vertically cast tubular articles, an endless trackway, means movable on said trackway for conveying flask molds through a cycle of molding operations, a flask bottom plate rigidly secured to said movable means, a pair of multiple mold flasks supported on said plate, and means rigidly securing each of said flasks to said plate.

MALCOLM KENNETH DOUGLAS.